(12) United States Patent
Rosenberg et al.

(10) Patent No.: US 8,040,862 B1
(45) Date of Patent: Oct. 18, 2011

(54) SYSTEM AND METHOD FOR PROVIDING EMERGENCY SERVICES IN A VISITED COMMUNICATIONS ENVIRONMENT

(75) Inventors: Jonathan D. Rosenberg, Freehold, NJ (US); Flemming S. Andreasen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 126 days.

(21) Appl. No.: 11/715,111

(22) Filed: Mar. 6, 2007

Related U.S. Application Data (60) Provisional application No. 60/780,176, filed on Mar. 6, 2006.

(51) Int. Cl.
*H04W 4/00* (2009.01)

(52) U.S. Cl. ............. 370/338; 370/352; 455/404.2; 455/435.1

(58) Field of Classification Search ........... 455/404.1, 455/404.2, 456.1, 435.1; 370/338, 352
See application file for complete search history.

(56) References Cited

U.S. PATENT DOCUMENTS

| | | | |
|---|---|---|---|
| 5,602,907 A | 2/1997 | Hata et al. ............... 379/114 |
| 5,822,411 A | 10/1998 | Swale et al. ............. 379/111 |
| 5,828,737 A | 10/1998 | Sawyer .................... 379/114 |
| 5,905,736 A | 5/1999 | Ronen et al. ............. 370/546 |
| 5,909,238 A | 6/1999 | Nagashima et al. ...... 348/3 |
| 5,946,670 A | 8/1999 | Motohashi et al. ....... 705/400 |
| 5,956,391 A | 9/1999 | Melen et al. ............. 379/114 |
| 5,970,477 A | 10/1999 | Roden ...................... 705/32 |
| 5,987,498 A | 11/1999 | Athing et al. ............. 709/203 |
| 6,016,509 A | 1/2000 | Dedrick .................... 709/224 |
| 6,035,281 A | 3/2000 | Crosskey et al. ......... 705/14 |
| 6,047,051 A | 4/2000 | Ginzboorg et al. ....... 379/130 |
| 6,070,192 A | 5/2000 | Holt et al. ................ 709/227 |
| 6,075,854 A | 6/2000 | Copley et al. ............ 379/211 |
| 6,131,024 A | 10/2000 | Boltz ....................... 455/405 |

(Continued)

FOREIGN PATENT DOCUMENTS

WO WO 98/26381 12/1997

(Continued)

OTHER PUBLICATIONS

PCT Notification of Transmittal of the International Search Report and the Written Opinion of the International Searching Authority, or the Declaration with attached PCT International Search Report and Written Opinion of the International Searching Authority in International Application No. PCT/US 07/05937, dated Oct. 25, 2007, 6 pages.

(Continued)

*Primary Examiner* — Pierre-Louis Desir
(74) *Attorney, Agent, or Firm* — Baker Botts L.L.P.

(57) ABSTRACT

An apparatus for routing in a network environment, is provided that includes an application manager residing in a home network and being operable to interface with an access terminal that makes an emergency call. When the call is placed, a call establishment message is transmitted and is marked as an emergency call, the home network recognizing an identity of a visited network emergency services application server that resides in a visited network. If the access terminal cannot reach the home network at the time the emergency call is made, the access terminal can make the emergency call directly through the visited network emergency services application server. In more particular embodiments, the home network knows the identity through configuration or through dynamic means. Alternatively, the home network knows the identity through a registration mechanism via the access terminal.

20 Claims, 2 Drawing Sheets

U.S. PATENT DOCUMENTS

| | | | |
|---|---|---|---|
| 6,137,791 A | 10/2000 | Frid et al. | 370/352 |
| 6,141,684 A | 10/2000 | McDonald et al. | 709/222 |
| 6,175,879 B1 | 1/2001 | Shah et al. | 709/330 |
| 6,208,977 B1 | 3/2001 | Hernandez et al. | 705/34 |
| 6,229,887 B1 | 5/2001 | Albers et al. | 379/219 |
| 6,282,573 B1 | 8/2001 | Darago et al. | 709/229 |
| 6,295,447 B1 | 9/2001 | Reichelt et al. | 455/417 |
| 6,330,562 B1 | 12/2001 | Boden et al. | 707/10 |
| 6,332,163 B1 | 12/2001 | Bowman-Amuah | 709/231 |
| 6,339,832 B1 | 1/2002 | Bowman-Amuah | 714/35 |
| 6,434,568 B1 | 8/2002 | Bowman-Amuah | 707/103 R |
| 6,434,628 B1 | 8/2002 | Bowman-Amuah | 714/48 |
| 6,438,594 B1 | 8/2002 | Bowman-Amuah | 709/225 |
| 6,442,748 B1 | 8/2002 | Bowman-Amuah | 717/108 |
| 6,466,964 B1 | 10/2002 | Leung et al. | 709/202 |
| 6,477,580 B1 | 11/2002 | Bowman-Amuah | 709/231 |
| 6,477,665 B1 | 11/2002 | Bowman-Amuah | 714/39 |
| 6,480,485 B1 | 11/2002 | Kari et al. | 370/352 |
| 6,490,451 B1 | 12/2002 | Denman et al. | 455/436 |
| 6,493,547 B1 | 12/2002 | Raith | 455/405 |
| 6,496,850 B1 | 12/2002 | Bowman-Amuah | 709/203 |
| 6,502,213 B1 | 12/2002 | Bowman-Amuah | 714/49 |
| 6,510,513 B1 | 1/2003 | Danieli | 713/156 |
| 6,529,909 B1 | 3/2003 | Bowman-Amuah | 707/10 |
| 6,529,948 B1 | 3/2003 | Bowman-Amuah | 709/217 |
| 6,539,396 B1 | 3/2003 | Bowman-Amuah | 707/103 R |
| 6,549,949 B1 | 4/2003 | Bowman-Amuah | 709/236 |
| 6,550,057 B1 | 4/2003 | Bowman-Amuah | 717/126 |
| 6,571,282 B1 | 5/2003 | Bowman-Amuah | 709/219 |
| 6,578,068 B1 | 6/2003 | Bowman-Amuah | 709/203 |
| 6,601,192 B1 | 7/2003 | Bowman-Amuah | 714/38 |
| 6,601,234 B1 | 7/2003 | Bowman-Amuah | 717/108 |
| 6,606,660 B1 | 8/2003 | Bowman-Amuah | 709/227 |
| 6,611,821 B2 | 8/2003 | Stahl et al. | 705/400 |
| 6,615,199 B1 | 9/2003 | Bowman-Amuah | 706/50 |
| 6,615,253 B1 | 9/2003 | Bowman-Amuah | 709/219 |
| 6,615,263 B2 | 9/2003 | Dulai et al. | 709/225 |
| 6,621,820 B1 | 9/2003 | Williams et al. | 370/395.31 |
| 6,636,242 B2 | 10/2003 | Bowman-Amuah | 715/764 |
| 6,640,238 B1 | 10/2003 | Bowman-Amuah | 709/203 |
| 6,640,244 B1 | 10/2003 | Bowman-Amuah | 709/207 |
| 6,647,262 B1 | 11/2003 | Demetrescu et al. | 455/436 |
| 6,665,537 B1 | 12/2003 | Lioy | 455/435 |
| 6,665,718 B1 | 12/2003 | Chuah et al. | 709/225 |
| 6,671,675 B2 | 12/2003 | Iwamura | 705/30 |
| 6,684,243 B1 | 1/2004 | Euget et al. | 709/222 |
| 6,684,256 B1 | 1/2004 | Warrier et al. | 709/238 |
| 6,708,225 B1 | 3/2004 | Cho et al. | 709/317 |
| 6,714,515 B1 | 3/2004 | Marchand | 370/231 |
| 6,715,145 B1 | 3/2004 | Bowman-Amuah | 718/101 |
| 6,728,266 B1 | 4/2004 | Sabry et al. | 370/468 |
| 6,728,365 B1 | 4/2004 | Li et al. | 379/329 |
| 6,728,884 B1 | 4/2004 | Lim | 713/201 |
| 6,742,015 B1 | 5/2004 | Bowman-Amuah | 718/101 |
| 6,742,036 B1 | 5/2004 | Das et al. | 709/226 |
| 6,757,371 B2 | 6/2004 | Kim et al. | 379/114.22 |
| 6,760,444 B1 | 7/2004 | Leung | 380/270 |
| 6,768,726 B2 | 7/2004 | Dorenbosch et al. | 370/331 |
| 6,769,000 B1 | 7/2004 | Akhtar et al. | 707/103 R |
| 6,771,623 B2 | 8/2004 | Ton | 370/331 |
| 6,785,256 B2 | 8/2004 | O'Neill | 370/338 |
| 6,804,518 B2 | 10/2004 | Core et al. | 455/436 |
| 6,826,173 B1 | 11/2004 | Kung et al. | 370/352 |
| 6,829,709 B1 | 12/2004 | Acharya et al. | 713/160 |
| 6,834,341 B1 | 12/2004 | Bahl et al. | 713/156 |
| 6,839,338 B1 | 1/2005 | Amara et al. | 370/338 |
| 6,842,906 B1 | 1/2005 | Bowman-Amuah | 719/330 |
| 6,856,676 B1 | 2/2005 | Pirot et al. | 379/201.01 |
| 6,889,321 B1 | 5/2005 | Kung et al. | 713/153 |
| 6,907,501 B2 | 6/2005 | Tariq et al. | 711/118 |
| 6,910,074 B1 | 6/2005 | Amin et al. | 709/227 |
| 6,915,345 B1 | 7/2005 | Tummala et al. | 709/225 |
| 6,917,605 B2 | 7/2005 | Kakemizu et al. | 370/338 |
| 6,920,503 B1 | 7/2005 | Nanji et al. | 709/230 |
| 6,922,404 B1 | 7/2005 | Narayanan et al. | 370/338 |
| 6,925,160 B1 | 8/2005 | Stevens et al. | 379/121.05 |
| 6,947,401 B2 | 9/2005 | El-Malki et al. | 370/331 |
| 6,961,774 B1 | 11/2005 | Shannon et al. | 709/227 |
| 6,967,941 B2 | 11/2005 | Roy | 370/338 |
| 6,978,128 B1 | 12/2005 | Raman et al. | 455/414 |
| 6,980,802 B2 | 12/2005 | Jung | 455/436 |
| 6,980,962 B1 | 12/2005 | Arganbright et al. | 705/26 |
| 6,981,047 B2 | 12/2005 | Hanson et al. | 709/227 |
| 6,982,967 B1 | 1/2006 | Leung | 370/328 |
| 6,987,849 B2 | 1/2006 | Ravishankar | 379/221.1 |
| 6,990,337 B2 | 1/2006 | O'Neill et al. | 455/422.1 |
| 6,993,333 B2 | 1/2006 | Laroia et al. | 455/436 |
| 7,003,294 B2 | 2/2006 | Singhai et al. | 455/435.1 |
| 7,020,697 B1 | 3/2006 | Goodman et al. | 709/223 |
| 7,024,687 B2 | 4/2006 | Chaudhuri et al. | 726/3 |
| 7,028,311 B2 | 4/2006 | Roach et al. | 719/328 |
| 7,039,027 B2 | 5/2006 | Bridgelall | 370/329 |
| 7,054,268 B1 | 5/2006 | Parantainen et al. | 370/231 |
| 7,079,499 B1 | 7/2006 | Akhtar et al. | 370/310 |
| 7,082,301 B2 | 7/2006 | Jagadeesan et al. | 455/436 |
| 7,103,359 B1 | 9/2006 | Heinonen et al. | 455/436 |
| 7,127,234 B2 | 10/2006 | Ishii | 455/411 |
| 7,130,286 B2 | 10/2006 | Koodli et al. | 370/331 |
| 7,133,386 B2 | 11/2006 | Holur et al. | 370/331 |
| 7,151,758 B2 | 12/2006 | Kumaki et al. | 370/331 |
| 7,151,772 B1 | 12/2006 | Kalmanek et al. | 370/390 |
| 7,154,868 B1 | 12/2006 | Sharma et al. | 370/331 |
| 7,161,914 B2 | 1/2007 | Shoaib et al. | 370/331 |
| 7,171,555 B1 | 1/2007 | Salowey et al. | 713/156 |
| 7,184,418 B1 | 2/2007 | Baba et al. | 370/331 |
| 7,187,931 B2 | 3/2007 | Trossen | 455/440 |
| 7,190,793 B2 | 3/2007 | Hsu | 380/270 |
| 7,197,763 B2 | 3/2007 | Hsu | 726/4 |
| 7,212,821 B2 | 5/2007 | Laroia et | 455/437 |
| 7,230,951 B2 | 6/2007 | Mizell et al. | 370/401 |
| 7,233,583 B2 | 6/2007 | Asthana et al. | 370/332 |
| 7,251,733 B2 | 7/2007 | Haverinen et al. | 713/182 |
| 7,263,371 B2 | 8/2007 | Das et al. | 455/456.1 |
| 7,269,727 B1 | 9/2007 | Mukherjee et al. | 713/160 |
| 7,272,122 B2 | 9/2007 | Trossen et al. | 370/331 |
| 7,272,123 B2 | 9/2007 | Wall | 370/331 |
| 7,275,156 B2 | 9/2007 | Balfanz et al. | 713/168 |
| 7,389,106 B2 | 6/2008 | Dawson et al. | 455/406 |
| 2001/0023428 A1 | 9/2001 | Miyazaki et al. | 709/201 |
| 2002/0021681 A1 | 2/2002 | Madour | 370/331 |
| 2002/0023174 A1 | 2/2002 | Garrett et al. | 709/245 |
| 2002/0036982 A1 | 3/2002 | Chen | 370/230 |
| 2002/0059114 A1 | 5/2002 | Cockrill et al. | 705/27 |
| 2002/0091802 A1 | 7/2002 | Paul et al. | 709/220 |
| 2002/0138601 A1 | 9/2002 | Piponius et al. | 709/223 |
| 2002/0151312 A1 | 10/2002 | Bos et al. | 455/452 |
| 2003/0021252 A1 | 1/2003 | Harper et al. | 370/338 |
| 2003/0039237 A1 | 2/2003 | Forslow | 370/352 |
| 2003/0154400 A1 | 8/2003 | Pirttimaa et al. | 713/201 |
| 2003/0187817 A1 | 10/2003 | Agrawal et al. | 707/1 |
| 2003/0217165 A1 | 11/2003 | Buch et al. | 709/229 |
| 2004/0114553 A1 | 6/2004 | Jiang et al. | 370/328 |
| 2004/0162876 A1 | 8/2004 | Kohavi | 709/203 |
| 2004/0162892 A1* | 8/2004 | Hsu | 709/221 |
| 2004/0196821 A1 | 10/2004 | Haddad et al. | 370/349 |
| 2004/0203573 A1* | 10/2004 | Chin et al. | 455/404.1 |
| 2004/0210524 A1 | 10/2004 | Benenati et al. | 705/40 |
| 2004/0259562 A1 | 12/2004 | Madour | 455/452.2 |
| 2005/0002407 A1 | 1/2005 | Shaheen et al. | 370/401 |
| 2005/0025132 A1 | 2/2005 | Harper et al. | 370/352 |
| 2005/0076117 A1 | 4/2005 | Hou et al. | 709/224 |
| 2005/0130659 A1 | 6/2005 | Grech et al. | 455/436 |
| 2005/0149651 A1 | 7/2005 | Doak et al. | 710/52 |
| 2005/0176428 A1 | 8/2005 | Gabor et al. | 455/435.1 |
| 2005/0195766 A1 | 9/2005 | Nasielski et al. | 370/331 |
| 2005/0201324 A1 | 9/2005 | Zheng | 370/328 |
| 2005/0213606 A1 | 9/2005 | Huang et al. | 370/467 |
| 2005/0220039 A1 | 10/2005 | Hoshino et al. | 370/261 |
| 2005/0233727 A1* | 10/2005 | Poikselka et al. | 455/404.2 |
| 2005/0278420 A1 | 12/2005 | Hartikainen et al. | 709/203 |
| 2005/0286709 A1 | 12/2005 | Horton et al. | 379/265.09 |
| 2006/0014547 A1 | 1/2006 | Walter | 455/456.1 |
| 2006/0018272 A1 | 1/2006 | Mutikainen et al. | 370/328 |
| 2006/0077924 A1 | 4/2006 | Rune | 370/328 |
| 2006/0116113 A1 | 6/2006 | Gass | 455/414.4 |
| 2006/0126630 A1 | 6/2006 | Shirazipour et al. | 370/392 |
| 2006/0171310 A1 | 8/2006 | Ahluwalia et al. | 370/229 |

| | | | | |
|---|---|---|---|---|
| 2006/0251038 | A1 | 11/2006 | Tamura et al. | 370/342 |
| 2006/0264207 | A1 | 11/2006 | Tamura et al. | 455/415 |
| 2006/0268819 | A1 | 11/2006 | Chen et al. | 370/349 |
| 2007/0008882 | A1 | 1/2007 | Oran | 370/229 |
| 2007/0036312 | A1 | 2/2007 | Cai et al. | 379/126 |
| 2007/0060097 | A1* | 3/2007 | Edge et al. | 455/404.1 |
| 2007/0086582 | A1 | 4/2007 | Tai et al. | 379/114.01 |
| 2007/0094712 | A1 | 4/2007 | Gibbs et al. | 726/3 |
| 2007/0121615 | A1 | 5/2007 | Weill et al. | 370/389 |
| 2007/0121642 | A1 | 5/2007 | Battin et al. | 370/395.2 |
| 2007/0153720 | A1 | 7/2007 | Baglin et al. | 370/328 |
| 2007/0254661 | A1 | 11/2007 | Chowdhury et al. | 455/436 |

FOREIGN PATENT DOCUMENTS

| | | |
|---|---|---|
| WO | WO 99/31610 | 12/1998 |
| WO | WO 2005/107297 | 11/2005 |

OTHER PUBLICATIONS

USPTO, Office Action dated Aug. 27, 2008 for U.S. Appl. No. 11/715,251 in the name of Flemming S. Andreasen, 27 pages.
PCT Notification of Transmittal of the International Search Report and the Written Opinion of the International Searching Authority, or the Declaration with attached PCT International Search Report and Written Opinion of the International Searching Authority in International Application No. PCT/US2006/046800, dated Nov. 10, 2008, 10 pages.
USPTO, Final Office Action dated Mar. 17, 2009 for U.S. Appl. No. 11/715,251 in the name of Flemming S. Andreasen, 16 pages.
U.S. Patent and Trademark Office Official Action in U.S. Appl. No. 11/715,251, dated Sep. 1, 2009, 11 pages.
U.S. Patent and Trademark Office Official Action in U.S. Appl. No. 11/715,251, dated May 11, 2010, 13 pages.
Baker, et al., "Cisco Architecture for Lawful Intercept in IP Networks", Network Working Group, Request for Comments: 3294, Category: Informational, 18 pages, Oct. 2004.
Draft—TR45—PN-3-4732-RV4 (to be published as TIA-835.1-D), 32 pages.
Draft—TR45—PN-3-4732-RV4 (to be published as TIA-835.2-D), 93 pages.
Draft—TR45—PN-3-4732-RV4 (to be published as TIA-835.3-D), 36 pages.
Draft—TR45—PN-3-4732-RV4 (to be published as TIA-835.4-D), 70 pages.
Draft—TR45—PN-3-4732-RV4 (to be published as TIA-835.5-D), 72 pages.
Draft—TR45—PN-3-4732-RV4 (to be published as TIA-835.6-D), 36 pages.
3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.
3GPP2 X.S0011-001-D, 3rd Generation Partnership Project 2 '3GPP2', "cdma2000 Wireless IP Network Standard: Introduction," Version 1.0, 33 pages, Feb. 2006.
3GPP2 C.S0063-0, 3rd Generation Partnership Project 2 '3GPP2', "cdma2000 High Rate Packet Data Supplemental," Version 1.0, 127 pages, Mar. 2006.
3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 257 pages, Mar. 2006.
3GPP2 C.S0024-A, 3rd Generation Partnership Project 2 '3GPP2', "cdma2000 High Rate Packet Data Air Interface Specification," Version 2.0, 1,223 pages, Jul. 2005.
B. Aboba, et al., "Extensible Authentication Protocol (EAP)," Network Working Group, RFC 3748, http://www.ietf.org/rfc/rfc3748.txt, 59 pages, Jun. 2004.
B. Aboba, D. Simon, "PPP EAP TLS Authentication Protocol," Network Working Group, RFC 2716, http://www.ietf.org/rfc/rfc2716.txt, 22 pages, Oct. 1999.
W. Simpson, "PPP Challenge Handshake Authentication Protocol (CHAP)," Network Working Group, RFC 1994, http://www.ietf.org/rfc/rfc1994.txt, 12 pages, Aug. 1996.
W. Simpson, "The Point-to-Point (PPP)," Network Working Group, RFC 1661, http://www.ietf.org/rfc/rfc1661.txt, 47 pages, Jul. 1994.
P. Eronen, et al., "Diameter Extensible Authentication Protocol (EAP) Application," Network Working Group, RFC 4072, http://www.ietf.org/rfc/rfc4072.txt, 29 pages, Aug. 2005.
P. Calhoun, et al., "Diameter Base Protocol," Network Working Group, RFC 3588, http://www.ietf.org/rfc/rfc3588.txt, 129 pages, Sep. 2003.
3rd Generation Partnership Project 2 "3GPP2"; "All-IP Core Network Multimedia Domain: Service Based Bearer Control—Stage 2;www.3gpp2.org-"; Version 1.0. Draft Version 0.21.0, 49 pages, Unknown.
PCT Notification of Transmittal of the International Search Report and the Written Opinion of the International Searching Authority, or the Declaration, International Application No. PCT/US07/05847, 9 pages, Oct. 26, 2007.
PCT Notification of Transmittal of the International Search Report and the Written Opinion of the International Searching Authority, or the Declaration, International Application No. PCT/US07/05849, 9 pages, Nov. 14, 2007.
Yegani et al., "System and Method for Access Authentication in a Mobile Wireless Network," U.S. Appl. No. 11/419,382, 20 pps, 3 pps drawings, filed May 19, 2006.
Yegani et al., "System and Method for Handover of an Access Terminal in a Communication Network," U.S. Appl. No. 11/682,735, 24 pps, 3 pps drawings, filed Mar. 6, 2007.
Yegani et al., "Enforcement of User Level Policies from Visited Networks in a Mobile IP Environment," U.S. Appl. No. 11/682,817, 22 pps, 2 pps drawings, filed Mar. 6, 2007.
Yegani et al, Authentication of Access Terminals in a Cellular Communication Network,: U.S. Appl. No. 11/682,857, 28 pps, 5 pps drawings, filed Mar. 6, 2007.
Andreasen et al., "System and Method of Consolidating Accounting Data for a Communication Session," U.S. Appl. No. 11/714,974, 40 pps, 3 pps drawings, filed Mar. 6, 2007.
Panda et al., "System and Method for Capturing Accounting Data for a Communication Session," U.S. Appl. No. 11/715,018, filed Mar. 6, 2007.
Rosenberg et al., "System and Method for Determining a Network for Processing Applications for a Communication Session," U.S. Appl. No. 11/715,019, 40 pps, 3 pps drawings, filed Mar. 6, 2007.
Rosenberg et al., "Determining a Policy Output for a Communication Session," U.S. Appl. No. 11/715,032, 31 pps, 4 pps drawings, filed Mar. 6, 2007.
Leung et al., "Communicating Packets Using a Home Anchored Bearer Path," U.S. Appl. No. 11/715,033, 33 pps, 4 pps drawings, filed Mar. 6, 2007.
Andreasen et al., "Posture-Based Network Authentication," U.S. Appl. No. 11/715,040, 23 pages, 2 pps drawings, filed Mar. 6, 2007.
Iyer et al., "Access Terminal for Communicating Packets Using a Home Anchored Bearer Path," U.S. Appl. No. 11/715,041, 33 pps, 4 pps drawings, filed Mar. 6, 2007.
Rosenberg et al., "System and Method for Exchanging Policy Information in a Roaming Communications Environment," U.S. Appl. No. 11/715,056, 42 pps, 3 pps drawings, filed Mar. 6, 2007.
Rosenberg et al., "Establishing Facets of a Policy for a Communication Session," U.S. Appl. No. 11/715,065, 32 pps, 4 pps drawings, filed Mar. 6, 2007.
Rosenberg et al., "Performing Deep Packet Inspection for a Communication Session," U.S. Appl. No. 11/715,073, 31 pps, 4 pps drawings, filed Mar. 6, 2007.
Rosenberg et al., "Assigning a Serving—CSCF During Access Authentication," U.S. Appl. No. 11/715,074, 22 pps, 2 pps drawings, filed Mar. 6, 2007.
Rosenberg et al., "System and Method for Providing Emergency Services in a Visited Communications Environment," U.S. Appl. No. 11/715,111, 39 pps, 2 pps drawings, filed Mar. 6, 2007.
Panda et al., "Application-Aware Policy Enforcement," U.S. Appl. No. 11/715,187, 28 pps, 2 pps drawings, filed Mar. 6, 2007.
Andreasen et al., "System and Method for Generating a Unified Accounting Record for a Communication Session," U.S. Appl. No. 11/715,210, 46 pps, 3 pps drawings, filed Mar. 6, 2007.

Andreasen et al., "Network-triggered quality of service (QoS) Reservation," U.S. Appl. No. 11/715,250, 21 pps, 2 pps drawings, filed Mar. 6, 2007.

Andreasen et al.; "Policy-Based Control of Content Intercept", U.S. Appl. No. 11/715,251, 23 pps, 2 pps drawings, filed Mar. 6, 2007.

Rosenberg et al., "System and Method for Network Charging Using Policy Peering," U.S. Appl. No. 11/715,256, 43 pps, 3 pps drawings, filed Mar. 6, 2007.

Online Inc., "Apogee Releases Content Usage-Based Billing Product Annotated Title—Software allows content usage-based billing," EContent, vol. 24, No. 5, NDN 173-0356-6509-7, 1 pg., Jul. 2001.

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg., Jun. 28, 2001.

Karsten Lüttge, "E-Charging API: Outsource Charging to a Payment Service Provider," NDN 174-0708-0924-8, pp. 216-227, 2001.

A. Herzberg, "Safeguarding Digital Library Contents: Charging for Online Content," D-Lib Magazine, NDN 174-0590-9051-8, 16 pgs., Jan. 1998.

Business Wire, "Apogee Networks Introduces Industry's First Content Usage-Based Billing Solution for Web Hosters," NDN 219-0281-6988-1, 2 pgs., May 8, 2001.

Business Wire, "Apogee Networks Announces Investment by Cisco Systems; Combined Efforts Enhance Billing Capabilities for Content Delivery Network Providers," NDN 219-0220-9035-0, 2 pgs., Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs., Oct. 10, 2000.

Business Wire, "Apogee Networks Unveils NetCountant Wireless Billing at SUPERCOMM; Company Demonstrates Industry First Wireless Content Usage Based Billing Solution," NDN 218-0324-8075-6, 2 pgs., Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs., Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs., Dec. 6, 2000.

Business Wire, "Apogee Networks Joins Content Alliance; Billing Expert to Join Industry Group Aimed at Advancing Content Networking," NDN 218-0181-2716-7, 3 pgs., Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs., Jun. 19, 2000.

Ylitalo, et al., *Re-thinking Security in IP based Micro-Mobility*, downloaded from www.tcs.hut.fi/Studies/T-79.5401/2005AUT/ISCO4-Vlitalo-e-al.pdf (12 pages), 2004.

\* cited by examiner

SYSTEM AND METHOD FOR PROVIDING EMERGENCY SERVICES IN A VISITED COMMUNICATIONS ENVIRONMENT

CROSS-REFERENCE TO RELATED APPLICATION

This Application claims priority under 35 U.S.C. §119 of provisional application No. 60/780,176 filed Mar. 6, 2006, entitled VERIZON WIRELESS MULTI-MEDIA PLUS (MMD+) PROGRAM SYSTEM ARCHITECTURE DOCUMENT. This Application also incorporates by reference that Provisional in its entirety.

TECHNICAL FIELD OF THE INVENTION

This invention relates in general to the field of communications and, more particularly, to a system and a method for providing emergency services in a visited communications environment.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic and the individualistic needs of new end users.

As the subscriber base of end users increases, proper routing and efficient management of communication sessions and data flows becomes even more critical. One significant area for any group of end users relates to emergency services (e.g. 911). The problem is particularly troubling in mobile service provider network architectures, where devices can roam from network to network. The issue is: How to offer an effective emergency service in a roaming environment. For example, if I am a customer of Cingular Wireless and I happen to vacation in Europe, I would like to be able to access emergency services if necessary. Emergency call scenarios are slightly more complex than conventional calls because there could be localized numbers. In cases where improper emergency service routing protocols are executed, the experience for any group of end users can suffer and even include grave consequences.

Thus, designing an effective network response to an emergency call provides a significant challenge to component manufacturers, system administrators, and network operators.

SUMMARY OF THE INVENTION

From the foregoing, it may be appreciated by those skilled in the art that a need has arisen for an improved communications approach that provides for an optimal response for an emergency call for one or more end users. In accordance with one embodiment of the present invention, a system and a method for providing an emergency services application server in a communications environment are provided that greatly reduce disadvantages and problems associated with conventional network routing techniques.

According to one embodiment of the present invention, an architecture for providing an optimal response to an emergency call made in a visited network environment is provided that includes an application manager residing in a home network and being operable to interface with an access terminal that makes an emergency call. When the call is placed, a Session Initiation Protocol (SIP) INVITE message is transmitted to the application manager and is marked as an emergency call, the home network recognizing an identity of a visited network emergency services application server that resides in the visited network. If the access terminal cannot reach the home network at the time the emergency call is made, the access terminal can make the emergency call directly through the visited network emergency services application server. In more particular embodiments, the home network knows the identity through configuration or through dynamic means. Alternatively, the home network knows the identity through a registration mechanism via the access terminal, the access terminal learning the identity from a local visited provider and passing that information to the home network as part of its registration.

In more specific embodiments, the architecture includes an application server in the home network, which is operable to perform specialized emergency services, the services being a selected one of broadcasting emergency data to additional end users or attaching a subscriber medical record to the call.

In still other embodiments, location information is attached to the INVITE message. In certain cases, the application manager is operable to directly route the call without further assistance from the visited network in certain scenarios. In yet other embodiments, the visited network has legacy connectivity to an emergency services center, whereby a home network provider uses an interface to pass the call back to the visited network where it reaches the visited network emergency services application server that can route the call towards a correct public service access point (PSAP).

Some embodiments of the present invention may provide a number of technical advantages. For example, according to one embodiment of the present invention, a communications approach is provided, where emergency calls follow the 'normal' path: understanding the axiom that the less that is different for emergency calls, the better the communications solution. In addition, the proposed protocol does not require additional registrations or extra messages or procedures during call setup. Certain embodiments of the present invention also allow the home network to offer enhanced services specific to emergency calls and, further, allow the home network to know about emergency calls made by its subscribers using normal accounting interfaces. The present invention may also better align with IETF standard techniques for emergency calling. Other advantages are discussed below with reference to specific example call flows.

Note that certain embodiments of the present invention may enjoy some, all, or none of these advantages. Other technical advantages may be readily apparent to one skilled in the art from the following figure, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
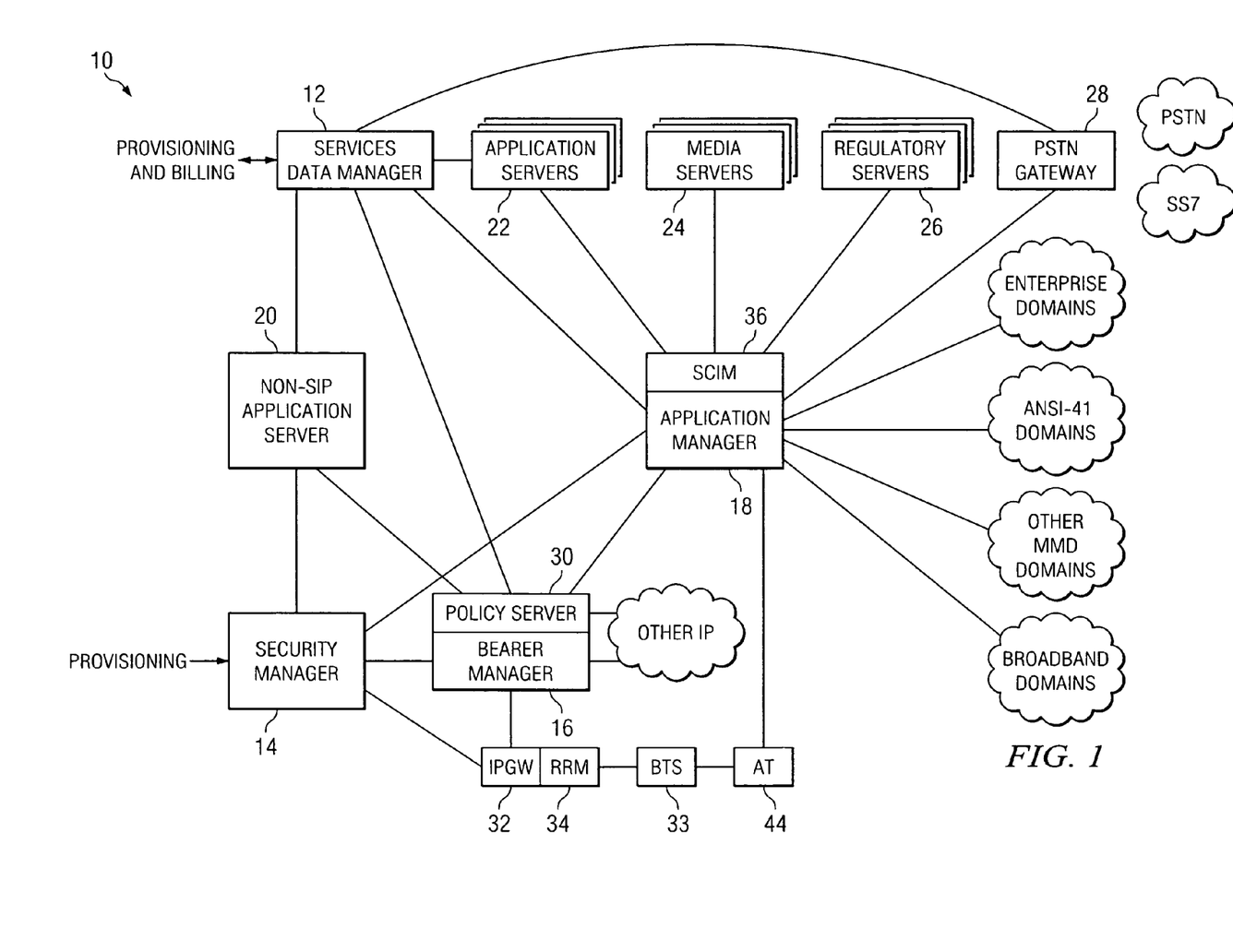
FIG. 1 is a simplified block diagram of a communications system for providing an appropriate response to an emergency call made in a visited communications environment in accordance with one embodiment of the present invention.

FIG. 1 is a simplified block diagram of a communications system 10 for communicating data in a network environment and, further, for providing an effective emergency response mechanism for a group of end users. Communication system 10 includes a services data manager 12 to which provisioning and billing flow. A security manager 14 is also included in the system, for providing security services. In addition, communication system 10 includes a bearer manger 16 (coupled to a policy server 30), an application manager 18 (coupled to a Service Capabilities Interaction Management (SCIM) element 36), a non-SIP application server 20, a group of application servers 22, a group of media servers 24, a group of regulatory servers 26, and a PSTN gateway, which is coupled to services data manager 12. Also included in communication system 10 are an IP gateway (IPGW) 32, a radio resource manager (RRM) 34, a base terminating station (BTS) 38, and an access terminal (AT) 44. A number of clouds are also depicted in FIG. 1, illustrating the various possible connectivity characteristics of the system.

FIG. 1, in this mobile network example, may be generally configured or arranged to represent a communication architecture, e.g., a 2.5G network applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communications system 10. For example, communications system 10 may cooperate with any version of a GPRS tunneling protocol (GTP) that includes application operations. This may be inclusive of first generation, 2G, and 3G architectures that provide features for application distribution. In another example, communications system 10 may cooperate with the Point-to-Point Protocol (PPP) that supports xDSL architectures providing features for application distribution.

In accordance with one embodiment of the present invention, a hybrid model is offered to provide improved emergency services to a group of end users. This is achieved by having the call routed to the home network first, and then back to the visited network using an emergency services application server. The server can be optional: used only if the home network cannot route the call itself. Furthermore, the client can use the emergency services application server directly if it cannot reach the home network at the time of the emergency call. Additional details related to specific flows are provided below with reference to FIGS. 2-3. Before turning to those discussions, however, some background information about the infrastructure of communication system 10 is offered for purposes of teaching. Following this brief description, existing systems are discussed in an effort to further explain some of the problems inherent to current emergency call response architectures.

Access terminals (or ATs) are normally mobile devices, but the architecture provides for fixed device access as well. The terminals can access the network through a high-speed wireless data network, providing them with suitable IP connectivity. ATs can also access the network through CDMA or alternative mechanisms, such as WiFi or even 1xRTT data. In the case of EVDO Rev A, the RAN includes the RRM and the BTS. The RAN is responsible for providing layer-2 mobile access, Quality of Service (QoS) on the access network, mobility functions, and handoff services within the area of coverage for a particular RAN.

The RAN interfaces with the IPGW, which is the first IP component in the network. Its job, as the name implies, is to act as a gateway between the layer-2 RAN access and the IP layer-3 network. The IPGW is responsible for authentication of the mobile to the network. It accomplishes that through an EAP exchange with the mobile and the SM, which holds the keys. IPGW performs communications with the RAN using the A10, A11, and A12 interfaces defined in CDMA, handoff functions between RAN and between IPGW, and for facilitating registration of the mobile to the IP network, using Mobile IP v6 (MIPv6). MIPv6 is used as the primary mobility technology at layer-3, although the architecture does not change in any fundamental way with IPv4. The IPGW is also responsible for accounting and QoS functions for the packets it forwards.

Though the interfaces from the IPGW towards the RAN are RAN-specific, the interfaces from the IPGW towards the rest of the network are not. This allows for IPGW to be deployed whose access networks are based on other technologies, such as WiFi. Because the IPGW performs functions such as authentication, handoff, and context transfer in ways that are not access network specific, the network allows for roaming and handoff functions seamlessly across these different access network technologies.

Through the mobile IP registration procedures, the mobile can be connected to the Bearer Manager (BM), which acts as the IP anchor point and MIPv6 Home Agent (HA). Because of its role as the IP anchor point, the BM also serves as the natural enforcement point for a host of network policies, including QoS, accounting, and mobility. The BM also provides security functions, such as firewall, intrusion detection, and DDoS attack prevention. The BM provides Deep Packet Inspection (DPI) functions, which allow for detection of application layer traffic passing through the BM. The BM also acts as a repository for network presence, including the roaming states for the mobile, its cell site location, etc.

Co-resident with the BM is the Policy Server (PS), which is sometimes referred to as the Policy Manager (PM). The PS is responsible for implementing the operator policies that govern the way in which the underlying IP network (the IPGW, BM and RAN) is utilized in support of the applications that run on top of the network. To do that, the PS controls the BM and IPGW by providing it with policies, called facets, which the BM and IPGW execute. The PS is contacted by numerous elements in the network for decisions on how they should proceed, in cases where such decisions impact the underlying use of the IP network.

Since one of the primary purposes of the network is to support mobile voice services, the Session Initiation Protocol (SIP) plays a prominent role in the architecture. SIP is used between the mobile and the Application Manager (AM), which acts as the main SIP server in the network. The AM is responsible for basic SIP functions, such as SIP registration and SIP call routing. The AM provides the basic set of voice features, such as call forwarding and call screening. It is responsible for authorizing SIP calls to and from endpoints, and routing those calls to the right terminating component, whether it be another AM, a gateway to the PSTN, or a peer operator. The AM can use ENUM to facilitate the routing of calls between providers, and leverages configured routing tables to route calls to the PSTN. The AM is responsible for invocation of SIP-based application servers, which can provide services like IP centrex and Push-To-Talk. These application servers reside on top of the AM, and are accessed using the IMS Service Control (ISC) interface. The AM provides Service Capabilities Interaction Management (SCIM) functions, which perform feature interaction management amongst its internal features and ones invoked in application servers. The AM also interacts with the PS over a DIAMETER interface, informing it of SIP session requests so that the network can be properly configured to support those sessions. The AM also provides user presence services through SIP for Presence and Messaging Leveraging Extensions (SIMPLE). Communication system 10 supports two different types of applications. One type is SIP-based applications. These application servers (AS) reside on top of the AM, using the ISC interface, and are invoked using SIP-based interactions. Communication System 10 also supports non-SIP applications. These applications are invoked directly by the AT (or through other triggers). However, access to these applications and coordination of underlying network resources in support of those applications is managed by the PS, to which the application server communicates. Indeed, the communications interface between the non-SIP AS and the PS is identical to the one between the AM and PS and can be based on DIAMETER.

Application servers can frequently need access to media processing functions, such as Interactive Voice Response (IVR), mixing functions, and messaging functions. Rather than have each application server implement these functions separately, they are extracted into a common set of servers, called media servers. These media servers represent coarse-grained application components that are not useful applications by themselves, but are useful when used by other applications. These servers are also known as service enablers.

Nearly all of the components in the network interface to the Security Manager (SM), also using a DIAMETER application, for example. The SM is the central access point for security services in the network. Authentication at all layers takes place through interactions with the SM, since the SM acts as the central repository and generation point for keying materials. The SM is the core of the Security Operations Center (SOC), which provides continuous management of threats in the network. The SM coordinates with the rest of the network to provide intrusion detection, network infrastructure security, establishment of traffic baselines, anomaly detection, etc. The SM owns the security policy for the network, pushing that security policy to various components, separately from the PS. This provides a clean separation between security and functional policies. The SM also performs posture assessment on mobiles, determining whether they can be permitted on the network, and with access to which services, based on the compliance of the mobile to standards for software compliance (such as OS versions, anti-virus versions, etc.).

The Services Data Manager (SDM) acts as the central repository of subscriber data in the network. All components needing access to subscriber data, including AM, PS and application servers, obtain this data from the SDM, also using a DIAMETER application. Since numerous protocols and devices are used in the network, each with potentially different identifiers, the SDM acts as the repository for the subscriber data model, and is able to relate together the various identifiers used within the system. The SDM provides basic Create/Read/Update/Delete (CRUD) services on the data, and is responsible for highly reliable storage of the data. Caching is used extensively and SDM is responsible for providing network elements of updates to the data so that caches can be updated or invalidated. The SDM also serves as the repository of accounting records for subscriber usage on the network. These records are read by back-end billing systems for correlation and billing. The SDM also stores various pieces of non-subscriber data, such as PSTN routing logic. Provisioning systems interface with the SDM, pushing subscriber data into it and reading it out.

Interconnection with the PSTN is accomplished through traditional SIP-based PSTN gateways, whether composed or decomposed. The regulatory server provides an interface for installation of intercept orders from law enforcement agencies, and the collection of data from the network for delivery to law enforcement agencies.

Turning now to current architectures that attempt to address emergency calls, the Internet Multimedia Subsystem (IMS) has been developed by 3GPP as a network architecture for mobile voice operators. The newest release of IMS, release 7, includes support for IP-based emergency services. In that architecture, the roaming client contacts a proxy (P-CSCF) in the visited network, and performs a special emergency services registration through it, towards the home network. The actual emergency call attempt is intercepted by the P-CSCF, and directed to an emergency CSCF (E-CSCF), which performs the call routing based on the location of the mobile, and then routes the call off to the right emergency access point.

This flawed architecture, however, has numerous limitations: 1. it requires a separate registration, which can fail for countless reasons and thus impact the ability to make an emergency call; 2. the actual call never passes through the home provider, so it has no easy way to know about the call and no way to provide any special processing to facilitate the call (such as attaching subscriber medical records to the call, or notifying parents that an emergency call has been made); and 3. Because the call is performed entirely within the visited network, home network mobility services, such as fixed-mobile convergence, may not function. Thus, an emergency call could not be handed off from WiFi to cellular.

In the proposed architecture of communication system 10, the P-CSCF moves to the home network, becoming part of the App Manager (AM). The E-CSCF instead turns into an emergency services application server, invoked by the service CSCF (S-CSCF), also part of the App Manager, from the home network. The mobile device performs a single registration, as it normally would. This registration goes from the phone to the AM in the home network.

The client is aware of the emergency services dial strings in its home network (through configuration) and in the visited network (through DHCP or other local discovery techniques). When the user dials an emergency number, the phone emits an INVITE marked as an emergency call. This request follows the normal call path, towards the AM in the home network. Since the AM gets the call and sees it as an emergency call, it can perform any specialized 911 services. These include attaching a subscriber medical record, or sending notifications to the family members of the caller that dialed 911, or recording the fact that an emergency call was made for accounting and legal purposes.

The caller would have also attached location information to the INVITE, if available. If the AM can route the call without further assistance from the visited network (for example, using a Location to Service Translation (LoST) query to determine the right serving emergency service center), it can do so directly. In many cases, it is expected that the visited network can have legacy connectivity to the emergency services center, and also know how to perform the routing. Consequently, the home network provider uses the ISC interface (used for invoking applications) and passes the call back to the visited network, where it reaches an emergency services application server. This server can route the call towards the right PSAP.

The home network can know the identity of the visited network emergency services application server through configuration, or through dynamic means. The preferred mechanism is that when the mobile registers, it learns the emergency services application server from the local visited provider (for example, by means of DHCP or other local discovery techniques), and passes that information to the home network as part of its registration. Alternatively, the identity of the emergency services application server can be passed to the home network in the contents of the INVITE message.

If the client cannot reach the home network at the time the emergency services call is made, the client can make the call directly through the emergency services application server. This provides a fallback in case an emergency disrupts network connectivity. Such a protocol has a multitude of advantages, including: 1. emergency calls follow the 'normal' path—the less that is different for emergency calls, the better; 2. does not require additional registrations or extra messages or procedures at call setup time; 3. allows the home network to offer enhanced services specific to emergency calls; 4. allows the home network to know about emergency calls made by its subscribers using normal accounting interfaces; 5. works with fixed-mobile convergence techniques, so that calls can be handed off from cellular to WiFi; 6. aligns better with IETF standard techniques for emergency calling; and 7. fits naturally into a long term architecture with LoST, when the visited network may not be required for call routing.

Figure 2:
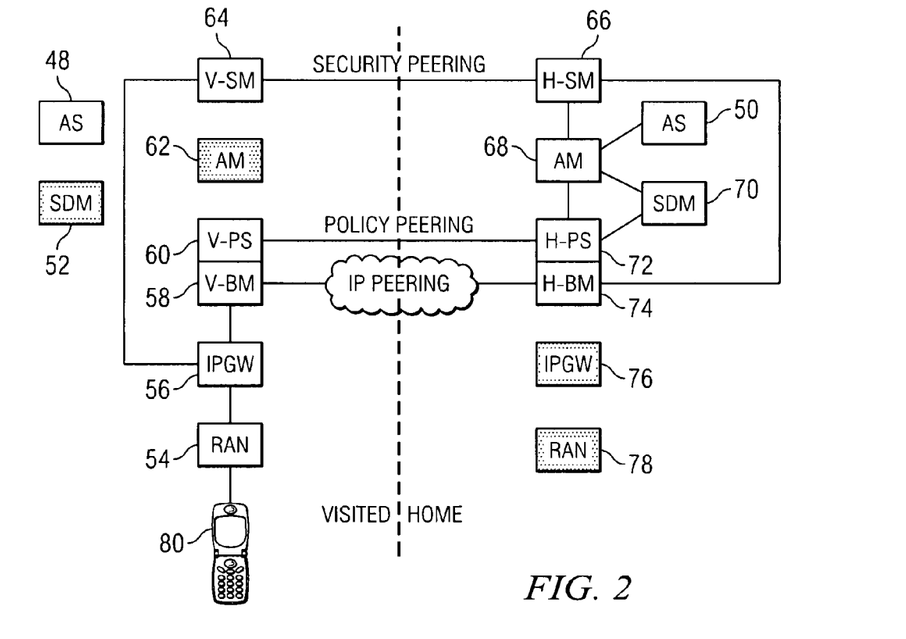
FIG. 2 is a simplified block diagram illustrating a more comprehensive example implementation of one potential embodiment of the present invention.

FIG. 2 is a simplified block diagram illustrating additional details associated with an example roaming architecture and, further, offers a simple arrangement according to the teachings of one embodiment of the invention. FIG. 2 depicts another example environment in which the present invention can operate. This FIGURE is slightly more comprehensive and, accordingly, includes a number of components that are not necessarily required to implement the present invention.

FIG. 2 includes a home and a visited network. Therefore, FIG. 2 often includes similar components residing in each network, such as: services data managers 52, 70, RANs 54, 78 IPGWs 56, 76, bearer managers 58, 74, and policy servers 60, 72 that execute policy peering. FIG. 2 further includes security managers 64, 66 that perform security peering, application managers 62 and 68, application server 48 and 50, and a mobile station 80.

Software and/or hardware may reside in home application manager 68 and/or the access terminal [mobile station 80] in order to achieve the teachings of the features of the present invention. Mobile station 80 would send the emergency call to the home network (as it would normally do), but it also knows to fail back to the visited application server if that call is not successful (i.e. the home server is not reached). Additionally, mobile station 80 knows to include an identifier, as outlined below. In a related endeavor, application manager 68 in the home network recognizes an emergency call, it knows to invoke special application servers, and it knows how to route the call back to the visited network for completing the call (e.g. based on location information), which is an optional step, as the home network can (in some situations) successfully route the call without invoking a second entity.

Note that, due to their flexibility, these components may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of home application manager 68 and/or the access terminal [mobile station 80] in the context of communications system 10 and, accordingly, they should be construed as such.

It should be noted that the internal structure of the system of FIG. 2 is versatile and can be readily changed, modified, rearranged, or reconfigured in order to achieve its intended operations or additional operations. Additionally, any of the items within FIGS. 1 and 2 may be combined, where appropriate, or replaced with other functional elements that are operable to achieve any of the operations described herein.

Before turning to the flow for an emergency call in a given network, some preliminary information about a typical roaming protocol is provided. It is imperative to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

When a user roams, some of the components of the architecture "split." For each split component, some processing is being contributed by an instance of that component in the visited network, and some processing is being contributed by an instance in the home network. In communication system 10, the BM/PS and SM are split. The IPGW resides entirely in the visited network, and the SDM and AM reside entirely in the home network. In some cases, there may be local services provided in the visited network; those would involve the usage of an application server that resides entirely in the visited network.

The basic roaming procedure is as follows. The AT connects to the RAN in the visited network, and connects to its IPGW as its point of attachment. The IPGW proceeds to authenticate the AT using EAP procedures. The IPGW_ passes the identity asserted by the mobile to the Visited SM (V-SM). The V-SM has no relationship with the subscriber. However, the identity of the subscriber is of the form user@domain. As such, the V-SM uses the domain part of the identifier to locate an SM in the home domain of the subscriber (the H-SM). This H-SM can either directly authenticate the client, and if not (because the client is served by a different H-SM), it can route the messaging to the correct H-SM. Authentication then proceeds as normal. At the end of the exchange, the IPGW knows the identity of the device, and if the device is integrated, of the subscriber. The EAP exchange can also provide the IPGW with the identity of several key services in the home network, including the BM and AM assigned to the subscriber in the home network.

At this point, the client obtains an IP address in the visited network. This is obtained by the client using DHCP. The IPGW, on receipt of the DHCP query, uses Proxy Mobile IP (PMIP), and obtains an IP address from a V-BM. The IPGW selects a V-BM based on visited network policies. Since the visited network has no relationship with the subscriber, those policies are never subscriber specific. Once the IPGW obtains an address from the V-BM, this address is then provided to the AT in the DHCP response. The AT then proceeds with mobile IP procedures to obtain an address from the home BM. The AT can register its visited address (which it obtained via DHCP) as the point-of-attachment to the home BM. The MIP procedures require the mobile (in the case of IPv6) or the IPGW (in the case of IPv4) to provide the address of the H-BM. This identity was passed to the IPGW during the EAP authentication process, and then passed to the mobile in the DHCP reply The V-BM can also pass other bootstrapping parameters to the AT in the DHCP reply. For example, the address of a configuration server for learning local dial plans is provided in the DHCP reply.

By registering the visited address as the point-of-attachment, the bearer path towards the home BM can include the V-BM. This has the benefit of hiding mobility within the visited network from the home BM. MIP binding updates may not be needed until the AT moves to a different provider network entirely. This localization of mobility improves the performance of the network and reduces the load on the BM.

The H-BM can authenticate the mobile IP registration. That authentication can, for integrated clients, be based on keys derived from the EAP authentication, otherwise, it is based on a shared secret provisioned into the device for purposes of MIP authentication. In either case, the H-BM interacts with the H-SM to authenticate the MIP registration.

Both the V-BM and H-BM can contact their respective policy servers to obtain policies that apply to the subscriber. Obtaining these policies involves the usage of policy server peering.

Once the MIP registration completes, the mobile proceeds with SIP registration. The SIP REGISTER message is sent directly from the AT to the AM, which resides in the home network. The AT will know the AM address as a consequence of DHCP. If the AT is not integrated, its AM is known through configuration, since the AM is statically assigned to the subscriber. These procedures are equally applicable to IPv6 (in which case MIPv6 and PMIPv6 are used) and IPv4 (in which case PMIPv4 is used).

With regards to the roaming procedures, for Mobile IPv6, as part of the access authentication process, the Home Bearer Manager address is provided to the IPGW by the H-SM. The client receives a Visited Address via a DHCP exchange with an IPGW associated with its point of attachment. The assigned address is taken from a subnet that is 'homed' on a bearer manager in the same region as the IPGW where the client is attached. The Visited Bearer Manager is chosen based on regional configuration in the visited network. This address is termed the Visited Address. It is this address that is used as the Care of Address when establishing a mobility binding with a Home Bearer Manager.

Prior to informing the device of the Care of Address and the Home Bearer Manager, Proxy MIPv6 procedures are used to establish a bidirectional tunnel between the Visited Bearer Manager and the IPGW. This allows the Visited Bearer Manager to forward traffic destined to a given Care of Address via the correct IPGW. As a client's point of attachment changes, Proxy MIPv6 procedures are used to re-register the client via the new point of attachment.

When the PMIPv6 procedures are complete, the DHCP response, containing the Visited Address, Home Bearer Manager address and home AM address is sent to the client. The IPv6 client then initiates a MIPv6 binding with the Home Bearer Manager. The Care of Address supplied in the MIPv6 Binding Request is the address assigned to the client by the Visited Bearer Manager. This binding initiation is routed to the Home Bearer Manager via the Visited Bearer Manager. The Home Bearer Manager authenticates the subscriber identifier with the H-SM. Successful authentication results in the Home Bearer Manager sending a Binding Acknowledgement and assigning an IPv6 address to the client from a subnet 'homed' at the Home Bearer Manager. Subscriber policy can be fetched at this time.

As the Care of Address is owned by the Visited BM, the binding response can be routed to the Visited BM from the Home BM. The previous PMIPv6 sequence ensures that the Visited BM can forward the Binding Acknowledgement to the client via the correct IPGW.

The device now has an IPv6 address assigned by the Home Bearer Manager and an IPv6 Care of Address associated with the Visited Bearer Manager. A tunnel exists between the Visited Bearer Manager and the IPGW to ensure that the Visited Bearer Manager may 'see' the bearer and control paths and can enforce visited network policy. For Mobile IPv4, the steps taken are very similar to those for the IPv6 client. Indeed, it is an objective of the design that the architecture not fundamentally differ between v4 and v6. A Home Bearer Manager for the client is assigned as part of the Access Authentication procedures. A visited address is assigned using DHCP procedures, a tunnel is established between the IPGW and Visited Bearer Manager using Proxy registration techniques and then a mobility binding established between the client and a Home Bearer Manager, Similar to the IPv6 case, DHCP is used for visited address assignment.

The authentication steps are identical to those for MIPv6. Following successful access authentication, a Proxy Registration establishes a mobility binding with the Visited Bearer Manager on behalf of the client. The Visited Bearer Manager is chosen based on regional configuration. The Visited Bearer Manager assigns an IP address to the client, this being returned to the IPGW as part of mobility binding establishment.

The AT sends a DHCP Discover message to the IPGW, and the Visited Address is provided to the client in a DHCP Acknowledgement message. The DHCP acknowledgement can also contain the Home BM address and the home AM address. The Visited Bearer Manager sends a Foreign Agent Advertisement to the client via the IPGW. The receipt of the Foreign Agent advertisement informs the client that the Foreign Agent for MIPV4 registration can be the V-BM. The client sends a MIPv4 Registration Request containing the Subscriber ID to the V-BM via the IPGW. The Registration Request is addressed to the V-BM. The Home Agent address field contains the address of the Home Bearer Manager identified in the DHCP Acknowledgement.

The V-BM, functioning as a MIPv4 Foreign Agent, sends the Registration Request to the Home Bearer Manager. The Care-of-Address in the MIPv4 Registration Request is the address of the Visited Bearer Manager. As the client has been assigned an address for which the Visited Bearer Manager acts as the Foreign Agent, all packets destined to the client traverse the Visited Bearer Manager. Hence, visited network policy can be applied at the Visited Bearer Manager. All traffic sent from the client is sent to the Visited Bearer Manager via the tunnel established between the IPGW and Visited Bearer Manager using the Proxy Mobility Registration procedures described above. This ensures that all traffic from the client is subject to visited network policy.

Layer-3 authentication of the Subscriber based on the subscriber ID is performed at the Home Bearer Manager, where a Home Address is assigned. The Home Address is returned in the MIPv4 Registration Reply, and that reply is sent to the Care-of-Address contained in the MIPv4 Registration Request. The Registration Reply is sent to the IPGW from the visited Bearer Manager and forwarded to the client. As a result of the Registration Request/Reply exchange, a path is established between the Home Bearer Manager and the Client. This path comprises a sequence of fixed paths, a Home Bearer Manager—Visited Bearer Manager path, the Visited Bearer Manager—IPGW path and the IPGW—Client path.

The device has an IPv4address assigned by the Home Bearer Manager and a IPv4 Visited Address associated with the Visited Bearer Manager. A tunnel exists between the Visited Bearer Manager and the IPGW to ensure that the Visited Bearer Manager may 'see' the bearer and control paths and can enforce visited network policy Turning now to the emergency call aspect of the present invention, the target architecture for emergency services is based on the third and final National Emergency Number Association (NENA) migration phase, also known as NENA i3, as well as current and in progress IETF standards. However, it is anticipated that full deployment and universal availability of the NENA i3 architecture can take quite some time, and hence the architecture provides intermediate steps as well.

With NENA i3, the Public Service Answering Point (PSAP) is IP-enabled and hence E911 may not have to be routed over the PSTN. Furthermore, with an IP-enabled PSAP, additional communication capabilities above and beyond those available for current emergency service are possible, e.g. video, or Instant Messaging (IM). Emergency calls can be divided into three steps: 1) identifying a call as an emergency call; 2) determining the correct PSAP to route the call to; and 3) delivering caller location information to the PSAP.

An assumption is made that at the time of the SIP registration process, the user can obtain the current location information from the network. The location information obtained may be civic and/or geographic. This location information may not be accurate at the time the user wants to place an emergency call, however it is retrieved to ensure there is at least some "last-known" location information available at the time the user wants to make an emergency call.

At the time the user wants to place an emergency call, the AT needs to recognize this fact. ATs with special "emergency" buttons or use of the special "service:sos" URN makes this easy, however emergency dial strings must be supported as well. Such dial strings are not universal. In the US for example, the emergency number dial-string is "911", whereas it is "112" in most European Countries. The phone is able to use the emergency dial-string the user is used to (e.g. "911") as well as the emergency dial-strings that are valid based on the user's current location (e.g. "112" if in Europe). However, in order to do this, we cannot just provision the phone with all valid emergency dial-strings in the world. First of all, this would require us to know about all such emergency dial-strings. Secondly, an emergency dial-string in one country may be a non-emergency dial-string in another country and resolution of such overlaps is needed. This is done as follows:

The AT is configured with one (possibly more) "default" emergency number dial-strings that the user normally uses to place emergency calls (e.g. "911"). These are dial strings that are valid in the home country of the user. When the AT is assigned an IP-address, a DHCP option is returned that identifies a locally available (i.e. in the visited IP network) emergency dial-string server (e.g. in the form of a SIP-URI). The user sends a message addressed to this emergency dial-string server with a document describing his current emergency dial-strings. The emergency dial-string server returns a document that provides the locally available emergency dial-strings as well as an indication of overlap between local dialing plans normally used in that area and the emergency dialing strings the user indicated. In case of overlap, local policy in the phone decides which one takes precedence. Once the phone has this information, it is now able to determine if a call is an emergency call or not. Thus, when a user dials one of these emergency numbers, the mobile recognizes the call as an emergency call. This in turn leads to special processing in the mobile, e.g. disabling of features that may interact with emergency calls.

The mobile contacts the location function to obtain its current location, which may be civic and/or geographic. The mobile then sends a SIP INVITE to the H-AM indicating the call is an emergency call by using the universal emergency service URN ("urn:service:sos"). Included with the call is a location object describing the mobile's current location.

The H-AM receives the emergency call and recognizes it as such (from the URN in the To header field or Request-URI). The H-AM now the uses location object provided and the IETF ECRIT mapping protocol to determine the proper IP-enabled PSAP for this call. The ECRIT mapping protocol takes a location object as input and provides the URI of the PSAP that should answer emergency calls for that location as output. The H-AM then forwards the call to the IP-enabled PSAP, which accepts it directly as a SIP session.

The above describes the intended long-term architecture. It has the benefit of not relying on the network in which the user is currently roaming in order to place emergency calls as well as allowing for consistent operation of network features provided by the AM (including policy, which may indicate preferential treatment), however it is predicated on two things: 1) worldwide deployment of IP-enabled PSAPs; and 2) deployment of IETF ECRIT mapping protocol with worldwide PSAP mapping data.

In practice, this can happen neither overnight, nor uniformly across the U.S., let alone the rest of the world. The architecture accounts for this as follows. First, if the AT is a dual-mode device, and it can recognize emergency calls as such, it can attempt to place emergency calls via the legacy cellular network (1xRTT), provided that cellular network coverage is available. Note that the phone can delay any kind of contact with the legacy 1xRTT network until it wants to place an emergency call. Second, when a user roams into an IP network, that network may have an Emergency Services Application Server (E-AS) available. If the H-AM is unable to complete the emergency call to the right PSAP (e.g. because it cannot determine what that PSAP is), it invokes an E-AS in the visited IP network. If there is no E-AS in the visited IP network, then the H-AM completes the call to a default PSAP, based on the information it has available. The E-AS can have a SIP-URI associated with it, however the H-AM initially has only a service URN ("sos"). The H-AM determines the proper E-AS SIP-URI by performing a DNS lookup that maps the "sos" URN to the name of an E-AS in the domain name associated with the IP network in which the user is currently residing.

It should be noted, that the approach above always uses the H-AM, as opposed to, for example, using an AM in the visited network. There are several benefits to this. First of all, by using the H-AM, existing application server features can still be provided for emergency calls. For example call logging can cover emergency calls as well. Secondly, by placing emergency calls through the H-AM, we avoid having two AMs in control of the AT at the same time and the potential feature interaction problems that may result in. We also enable the H-AM to provide special treatment for the emergency call and inform the Policy Server that this request is for an emergency call. As a result of this, the PS may for example decide to take network resources from other applications, both SIP and non-SIP, in order to let the emergency call through.

Figure 3:
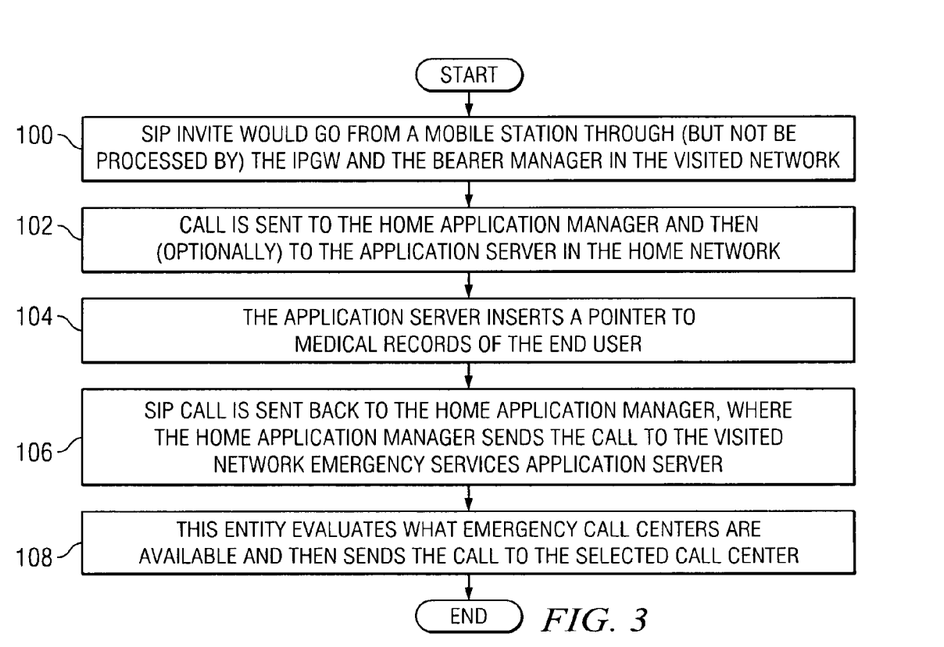
FIG. 3 is a simplified flowchart illustrating a simple call flow according to the teachings of one embodiment of the invention.

FIG. 3 is a simplified flowchart that addresses a basic example call flow for one embodiment of the present invention. The flow begins where an end user, who has roamed into a visited network during a vacation in Europe, elects to dial an emergency number. The SIP Invite would go from a mobile station through (but not be processed by) the IPGW and the BM in the visited network; this is illustrated in step 100. The call would end up at the home AM and then optionally to the AS in the home network [shown as step 102]. In this example, the AS inserts a pointer to medical records of the end user at step 104. For example, the end user in this situation could be diabetic or have an allergy to certain medications.

The SIP call is sent back to the home AM at step 106, where the home AM sends the call to the visited network emergency services AS. This entity evaluates what emergency call centers are available and then sends the call to the selected call center at step 108. In this manner, an optimal response has occurred for the original emergency call.

Some of the steps discussed with reference to FIGURE may be changed or deleted where appropriate and additional steps may also be added to these process flows. These changes may be based on specific communication architectures or particular interfacing arrangements and configurations of associated elements and do not depart from the scope or the teachings of the present invention.

Although the present invention has been described in detail with reference to particular embodiments, communications system 10 may be extended to any scenario in which end user 12 is provided with emergency call options in the context of a wired or a wireless connection or coupling. This may also be extended to any other network signaling protocols to achieve the teachings of the present invention.

Moreover, significant flexibility is provided by communications system 10 in that any suitable one or more components may be replaced with other components that facilitate their operations.

Additionally, although described in specific environments and contexts, the present invention could be used in countless applications. Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for routing in a network environment, comprising:
    an application manager operable to:
        interface with an access terminal in a visited network that makes an emergency call, the application manager residing in a home network of the access terminal;
        receive an emergency call transmitted by the access terminal in the visited network;
        in response to receiving the emergency call, perform one or more emergency services at the home network using information available in the home network but not in the visited network;
        process the emergency call, the processing comprising determining an identity of a visited network emergency services application server that resides in the visited network; and
        send the emergency call to the visited network emergency services application server such that the emergency call is routed through the home network.

2. The apparatus of claim 1, wherein the identity of the visited network emergency services application server is determined by the application manager from the home network, the home network receiving the identity of the visited network emergency services application server through configuration or through dynamic means.

3. The apparatus of claim 1, wherein the identity of the visited network emergency services application server is determined by the application manager from the home network, the home network receiving the identity of the visited network emergency services application server through a registration mechanism via the access terminal, the access terminal receiving the identity from a local visited provider.

4. The apparatus of claim 1, wherein the emergency call comprises location information.

5. The apparatus of claim 1, wherein the application manager operable to send the emergency call to the visited network emergency services application server comprises the application manager operable to directly route the emergency call without further assistance from the visited network.

6. The apparatus of claim 1, wherein the visited network has legacy connectivity to an emergency services center, and wherein the application manager is operable to send the emergency call to the visited network emergency services application server such that the visited network emergency services application server can route the call towards a public service access point associated with the emergency services center.

7. A method for routing in a network environment, comprising:
    interfacing, by an application manager residing in a home network, with an access terminal in a visited network;
    receiving, by the application manager, an emergency call transmitted by the access terminal in the visited network;
    in response to receiving the emergency call, performing one or more emergency services at the home network using information available in the home network but not in the visited network;
    processing, by the application manager, the emergency call, the processing comprising determining an identity of a visited network emergency services application server that resides in the visited network; and
    sending, by the application manager, the emergency call to the visited network emergency services application server such that the emergency call is routed through the home network.

8. The method of claim 7, wherein the identity of the visited network emergency services application server is determined by the application manager from the home network, the home network receiving the identity of the visited network emergency services application server through configuration or through dynamic means.

9. The method of claim 7, wherein the identity of the visited network emergency services application server is determined by the application manager from the home network, the home network receiving the identity of the visited network emergency services application server through a registration mechanism via the access terminal, the access terminal receiving the identity from a local visited provider.

10. The method of claim 7, wherein the emergency call comprises location information.

11. The method of claim 7, wherein sending, by the application manager, the emergency call to the visited network emergency services application server comprises routing the emergency call without further assistance from the visited network.

12. The method of claim 7, wherein the visited network has legacy connectivity to an emergency services center, and wherein sending, by the application manager, the emergency call to the visited network emergency services application server such that the visited network emergency services application server can route the call towards a public service access point associated with the emergency services center.

13. Software for routing in a network environment, the software being embodied in at least one non-transitory computer readable medium and comprising code that, when executed, is operable to:
- interface, by an application manager residing in a home network, with an access terminal in a visited network;
- receive, by the application manager, an emergency call transmitted by the access terminal in the visited network;
- in response to receiving the emergency call, perform one or more emergency services at the home network using information available in the home network but not in the visited network;
- process, by the application manager, the emergency call, the processing comprising determining an identity of a visited network emergency services application server that resides in the visited network; and
- send, by the application manager, the emergency call to the visited network emergency services application server such that the emergency call is routed through the home network.

14. The at least one medium of claim 13, wherein the identity of the visited network emergency services application server is determined by the application manager from the home network, the home network receiving the identity of the visited network emergency services application server through configuration or through dynamic means.

15. The at least one medium of claim 13, wherein the identity of the visited network emergency services application server is determined by the application manager from the home network, the home network receiving the identity of the visited network emergency services application server through configuration or through dynamic means.

16. The at least one medium of claim 13, wherein the emergency call comprises location information.

17. The at least one medium of claim 13, wherein the code operable to send, by the application manager, the emergency call to the visited network emergency services application server comprises the code operable to route the emergency call without further assistance from the visited network.

18. The at least one medium of claim 13, wherein the visited network has legacy connectivity to an emergency services center, and wherein the code is operable to send, by the application manager, the emergency call to the visited network emergency services application server such that the visited network emergency services application server can route the call towards a public service access point associated with the emergency services center.

19. A method for routing in a network environment, comprising:
- receiving, in a home network, an emergency call transmitted by an access terminal in a visited network;
- in response to receiving the emergency call, performing one or more emergency services at the home network using information available in the home network but not in the visited network;
- processing, at the home network, the emergency call, the processing comprising determining an identity of a visited network emergency services application server that resides in the visited network; and
- sending the emergency call to the visited network emergency services application server such that the emergency call is routed through the home network and processed by the visited network emergency services application server.

20. A system comprising:
- means for interfacing, by an application manager residing in a home network, with an access terminal in a visited network;
- means for receiving, by the application manager, an emergency call transmitted by the access terminal in the visited network;
- means for performing one or more emergency services at the home network in response to receiving the emergency call using information available in the home network but not in the visited network;
- means for processing, by the application manager, the emergency call, the processing comprising determining an identity of a visited network emergency services application server that resides in the visited network; and
- means for sending, by the application manager, the emergency call to the visited network emergency services application server such that the emergency call is routed through the home network.

* * * * *